(12) United States Patent
Kawashima et al.

(10) Patent No.: US 7,023,779 B2
(45) Date of Patent: Apr. 4, 2006

(54) OPTICAL DISC, RECORDING DEVICE, AND RECORDING DEVICE

(75) Inventors: Keiichi Kawashima, Hirakata (JP); Takashi Yumiba, Kyotanabe (JP); Kouichi Morioka, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 564 days.

(21) Appl. No.: 10/239,914

(22) PCT Filed: Mar. 28, 2001

(86) PCT No.: PCT/JP01/02561

§ 371 (c)(1),
(2), (4) Date: Sep. 27, 2002

(87) PCT Pub. No.: WO01/73784

PCT Pub. Date: Oct. 4, 2001

(65) Prior Publication Data

US 2003/0048719 A1 Mar. 13, 2003

(30) Foreign Application Priority Data

Mar. 29, 2000 (JP) .......................... 2000-90339

(51) Int. Cl.
*G11B 7/00* (2006.01)

(52) U.S. Cl. .................. 369/53.21; 369/53.24
(58) Field of Classification Search .......... 369/53.21, 369/53.24
See application file for complete search history.

(56) References Cited

U.S. PATENT DOCUMENTS

| | | | | |
|---|---|---|---|---|
| 5,132,954 A | * | 7/1992 | Kulakowski et al. | 369/47.12 |
| 6,377,524 B1 | * | 4/2002 | Ko | 369/47.14 |
| 6,564,319 B1 | * | 5/2003 | Peters et al. | 713/156 |
| 6,615,351 B1 | * | 9/2003 | Sedlak et al. | 713/172 |
| 6,636,689 B1 | * | 10/2003 | Stebbings | 386/94 |

FOREIGN PATENT DOCUMENTS

| | | |
|---|---|---|
| EP | 0741382 A1 | 11/1996 |
| JP | 11-3568 | 1/1999 |

* cited by examiner

*Primary Examiner*—Gautam R. Patel
(74) *Attorney, Agent, or Firm*—Wenderoth, Lind & Ponack, L.L.P.

(57) ABSTRACT

An optical disc storing a copyrighted digital product has a data area in which N processed parts are provided in order to certify that the stored digital product is an original one. A BCA provided on the optical disc stores judgment criteria information as well as N pieces of physical feature information. The judgment criteria information includes a numeric value N being the total number of processed parts, and a numeric value M being an integer between 0 and N inclusive and representing the security level to be assured for the digital data stored. When a numeric value P being the total number of processed parts in a normal state exceeds the numeric value M, a reproduction device reproduces the optical disc. When the numeric value P falls short of the numeric value M, the reproduction device does not reproduce the optical disc.

9 Claims, 10 Drawing Sheets

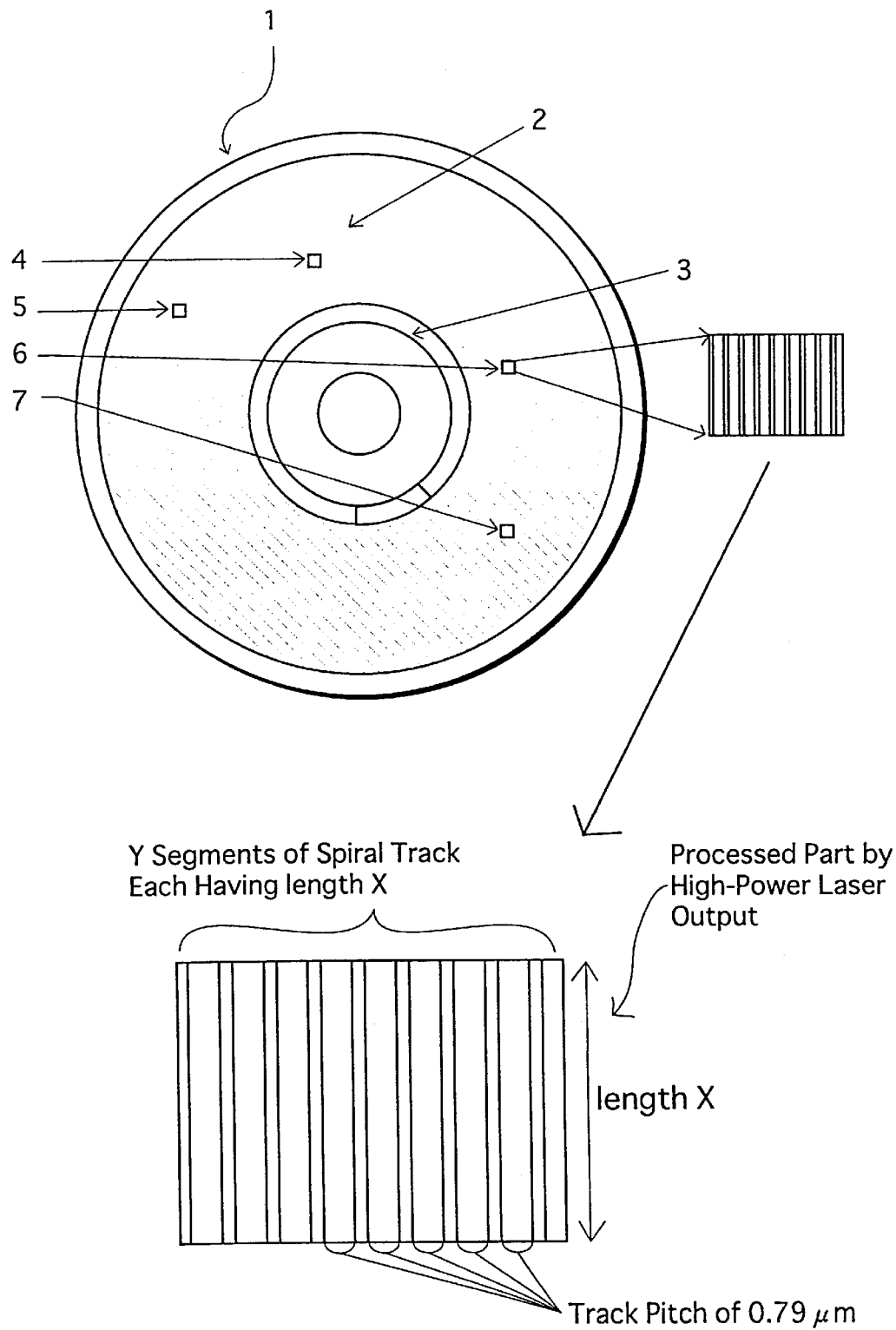

FIG.10A

Current Date Measured By Timer In Reproduction Device  January 11, 2001
Recording Date Indicated in Management Information  March 29, 2001

Weighting Factor $\alpha = 1$

FIG.10B

Current Date Measured By Timer In Reproduction Device  January 11, 1999
Recording Date Indicated in Management Information  March 29, 2001

Weighting Factor $\alpha = 0.3$

OPTICAL DISC, RECORDING DEVICE, AND RECORDING DEVICE

TECHNICAL FIELD

The present invention relates to an optical disc having a copyrighted digital product recorded thereon, a reproduction device for reproducing the recorded digital product, and a recording device. Especially, the present invention relates to an improvement in processing the optical disc for copyright protection.

BACKGROUND ART

Copyrighted digital products such as game software and movie software are put into the market in the form of optical discs having a copyrighted digital product recorded thereon. One problem that is seriously troubling copyright holders of digital products as well as optical disc manufactures is distribution of unauthorized discs that store illicitly copied game software or movie software. In order to distinguish their original optical discs from unauthorized discs, the manufacturers provide processing on the original discs so as to prove that they are original. Examples of such processing include (1) applying a coating on an optical disc at any given part, (2) intentionally damaging an optical disc at any given part, and (3) embedding a specific data pattern randomly. Original discs processed in any of the above manner are reproduced after being checked by an authorized reproduction device as follows. That is, when instructed to reproduce an optical disc, a reproduction device manufactured by an authorized manufacturer checks whether the optical disc includes a processed part and whether the processed part is in a normal state, thereby judging whether the optical disc is an original disc. Upon judging the optical as original, the reproduction device reproduces the optical disc. Contrary, when the optical disc includes no processed part, or when the processed part is in an abnormal state, the reproduction device does not reproduce the optical disc. In this manner, only optical discs manufactured under authorization are reproduced while avoiding reproduction of unauthorized discs.

However, even for the sake of copyright protection, such a processed part present on an original disc requires users to handle the original optical disc with care so as not to contaminate or damage the processed part. If a user is in possession of a numerous original discs, he is required to handle every one of these discs with care, which is troublesome. In case where an optical disc is no longer reproducible due to a slight contaminant or damage, complaints against the product will be addressed to the optical disc manufacturer, and the confidence in the optical disc manufacturer will be damaged severely. Such an event is undesirable not only for the users but also for the manufacturer at all.

DISCLOSURE OF THE INVENTION

An object of the present invention is to provide an optical disc reducing troubles imposed on a user while protecting copyright protection.

The above object is achieved by an optical disc including a data area and a specific area. The data area has digital data recorded therein, and N number of certification areas provided therein. Each certification area certifies that the digital data is original data. The specific area has a numeric value N and a numeric value M recorded therein. The numeric value N represents the total number of certification areas. The numeric value M is an integer from 0 to N inclusive and represents a security level of the digital data. This optical disc includes the N certification areas and stores the numeric value M of which upper limit is the value N and which represents the security level. In the case where the value N is equal to 10, read errors which occur in two or three of the certification areas have no effect as long as at least M certification areas are read normally. Users in possession of numerous original discs are required to exercise great care in handling only those optical discs that are considered to be important by the copyright holders and manufactures, and thus set to have high security levels. Contrary, much less care is required for users in handling optical discs that are considered to be less important by the copyright holders and manufactures and thus set to have lower security levels. As such, overall troubles required for the users in handling optical discs are reduced.

A reproduction device for the above optical disc includes: reading means for reading the numeric value M recorded on the optical disc in the specific area; verifying means for verifying whether each of the N certification areas is in a normal state; and judging means for judging whether the digital data recorded on the optical disc is original data by comparing a numeric value P with the numeric value M. The numeric value P is the number of certification areas in a normal state (P being an integer from 0 to N inclusive). The reproduction device reproduces the optical disc as long as there are at least M certification areas judged to be in a normal state. This allows users to handle the optical disc with little care.

Here, in the reproduction device, the judging means may judge the digital data recorded on the optical disc to be original data when the numeric value P is equal to or greater than a value obtained by multiplying the numeric value M by a weighting factor. With this construction, in the case where it has been a long time since the release of a copyrighted digital product recorded on the optical disc, the optical disc is judged as original even though relatively a larger number of disc identifiers result in read errors. Thus, users do not have to be attentive in handling such optical discs that was commercially released long ago. Thus, the users are gradually rendered free from troublesome handling of the optical disc.

BRIEF DESCRIPTION OF THE DRAWINGS

FIG. 3 is a view showing a processed part 6 in enlarged dimension;

FIGS. 10A and 10B are views showing examples of how a weighting factor α is determined based on a recording date indicated in management information and a current date measured by a timer installed in the reproduction device.

BEST MODE FOR CARRYING OUT THE INVENTION

Hereinafter, description is given to embodiments of an optical disc and a reproduction device consistent with the present invention.

(First Embodiment)

Figure 1:
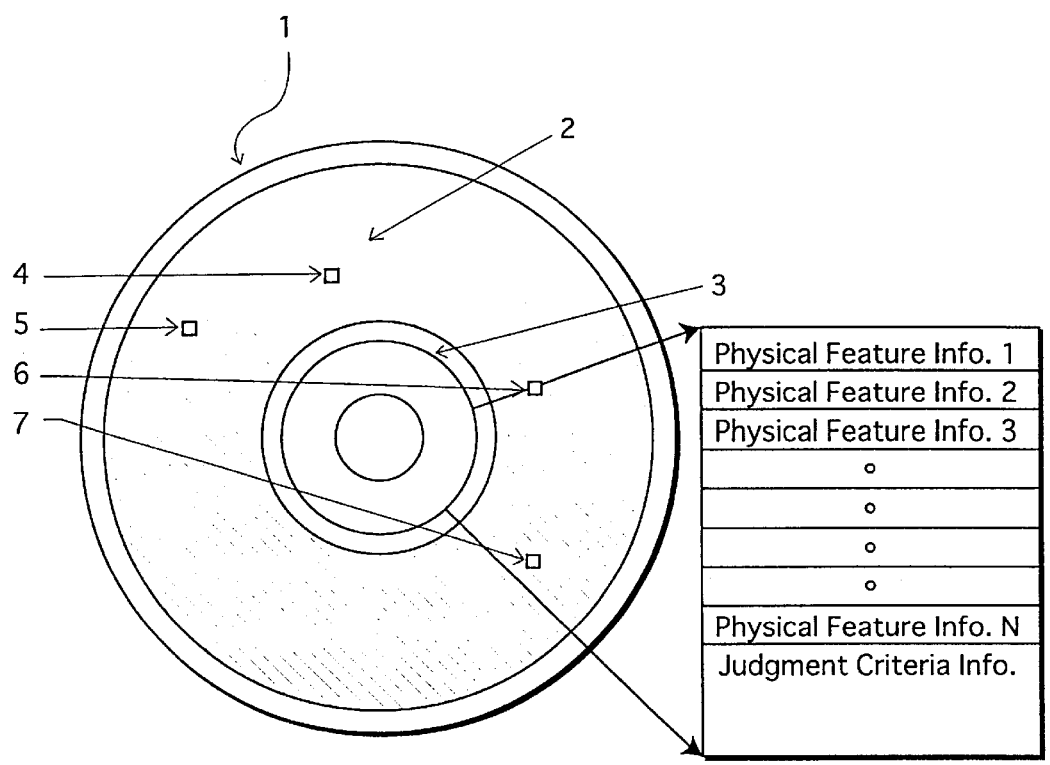
FIG. 1 is a view showing the external representation of an optical disc 1 according to a first embodiment.

FIG. 1 is a view showing the external representation of an optical disc 1 according to this embodiment. An area of the optical disc 1 is roughly divided into two, which are a data area 2 that stores data constituting a copyrighted digital product, and a BCA (Burst Cutting Area) 3. Present in the data area 2 at randomly selected positions are N processed parts 4, 5, 6 and 7 (in the figure, N=4) that are processed though irradiation of high-power laser.

Figure 2A:
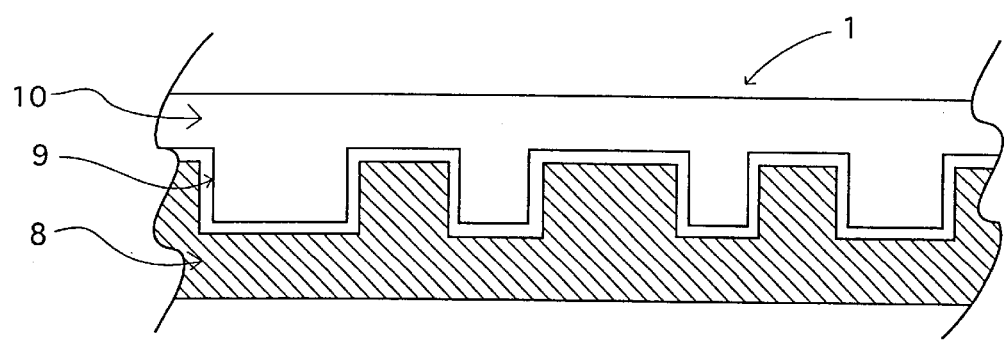
FIG. 2A is a view showing the cross section of the optical disc 1.

FIG. 2A shows the cross section of the optical disc 1. As shown in FIG. 2A, the optical disc 1 is composed of a substrate 8 forming concave pits and convex pits, a reflective layer 9 formed on the substrate 8 through aluminum vapor deposition, and a protective layer 10 which is a transparent material provided for protecting the substrate 8 and the reflective layer 9. Formed on the substrate 8 are strings of both concave pits and convex pits. Each of the concave pits and convex pits has a length of 3T–14T (T=0.133 μm), and altogether form a spiral track on the substrate 8.

Figure 2B:
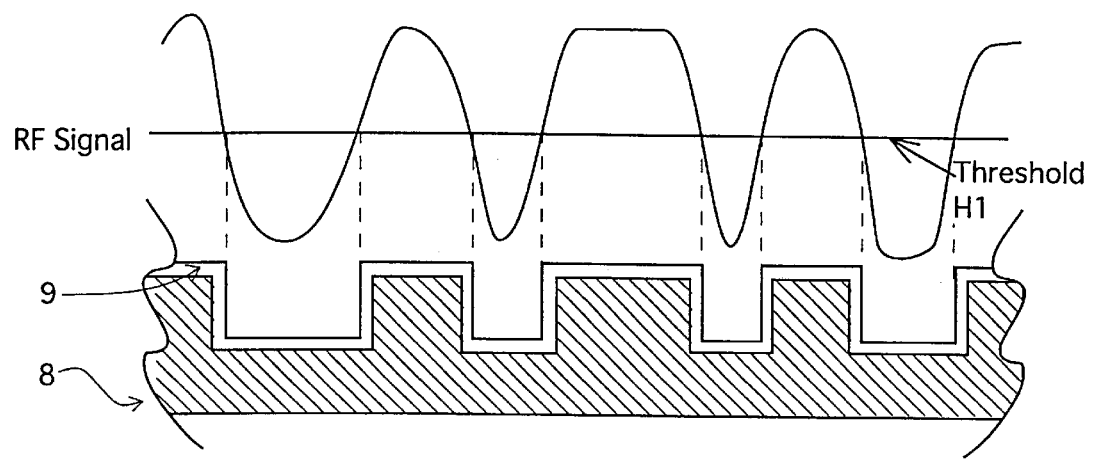
FIG. 2B is a view showing RF signals obtained through laser irradiation onto concave pits and convex pits located within a data area 2 followed by electric conversion of the reflected light from the concave pits and convex pits.
Figure 4A:
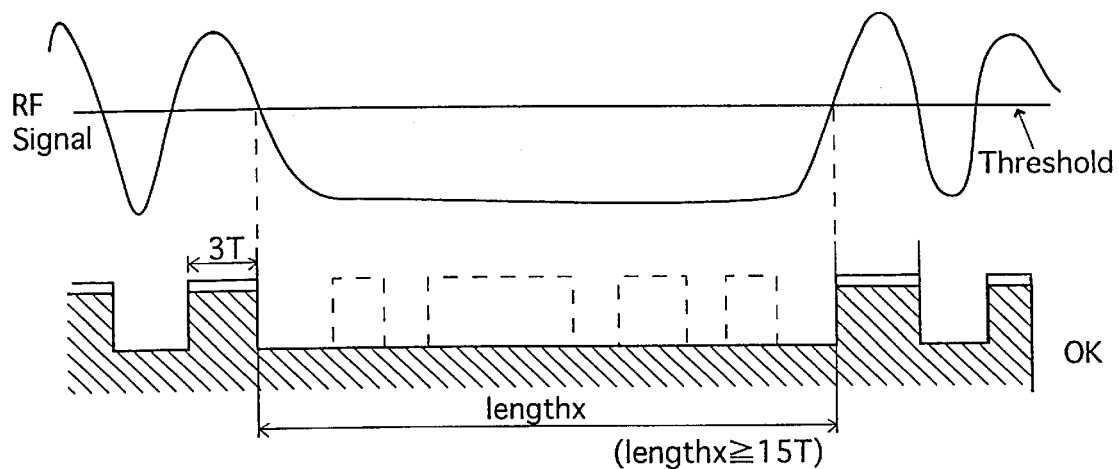
FIG. 4A is a view showing a track segment composed solely of one concave pit that extends a length X.

Through laser irradiation onto the concave pits and convex pits located within the data area 2 followed by electric conversion of the reflected light from the concave pits and convex pits, RF signals as shown in FIG. 2B are obtained. Generally, RF signals are electric signals which are generated through photoelectric conversion of reflected waves from concave pits and convex pits being irradiated with a laser beam, and of which amplitude has been equalized. Through binarization of the resulting RF signals with a predetermined threshold H1, binary signals are obtained. The resulting binary signals are then subjected to demodulation and error correction, so that digital data constituting the copyrighted digital product is obtained. Next, description is given to the processed parts 4–7. FIG. 3 is a view showing one of the processed parts, which in this case is the processed part 6, in enlarged dimension. In this figure, the processed part includes Y segments of the spiral track each having a length X (the length X is equal to 15T or longer). In the processed part, the track segments are spaced from one another at intervals of 0.79 μm. The processed part is set to have a size correctable with the above described error correcting code. The track segments included in the processed part have one of the two types of shape shown in FIGS. 4A and 4B. FIG. 4A shows a track segment composed solely of a concave pit having the length X. Originally, there were both concave pits and convex pits each having a length 3T–14T in the track segment but the convex pits shown by the dotted lines were melted through irradiation of high-power laser.

The track segment shown in FIG. 4A is the type of track segment in which one concave pit extends the length X. Thus, the RF signals obtained by reading this type of track segment using an optical pickup show a low section that is longer in comparison with the RF signals obtained by reading usual concave pits and convex pits. It should be noted that such RF signals that show a longer low section than usual are not possibly reproduced by a commercially available reproduction device, and are not possibly recorded onto another optical disc by a commercially available recording device. That is, a commercially available reproduction device is capable of reading a string of concave pits and convex pits each having a length of 3T–14T, and a commercially available recording device is capable of recording a string of concave pits and convex pits each having a length of 3T–14T on a rewritable disc such as a hard disc, CD-R, and DVD-R. When reading RF signals reflected from a concave pit longer than a usual length, a commercially available reproduction device and recording device judge such RF signals as irregular ones and thus skips reading so that neither reproduction process nor record process is performed. As such, a track segment having the length X is not possibly recorded on a rewritable disc by way of casual copying. In other words, a track segment having the length X present on an optical disc proves that the optical disc is an original one manufactured by an authorized manufacturer. Hereinafter, such a track segment is referred to as a disc identifier. Among Y track segments included in one processed part, the address and length of a track segment functioning as a disc identifier is encrypted and recorded in the BCA 3 as physical feature information.

Reproduction devices manufactured and sold under authorization for use in reproducing such optical discs is capable of reading a disc identifier from an optical disc to be reproduced to judge how long a low section in the RF signals continues. Based on the length of the low section, the reproduction devices judge whether the subject optical disc is an authorized one or an unauthorized rewritable disc storing an illicitly copied digital product by way of casual copying.

Figure 4B:
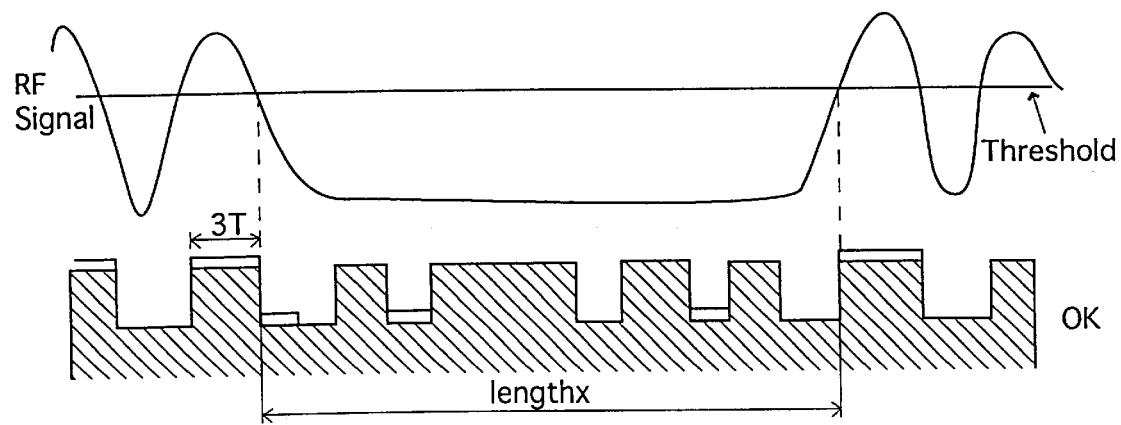
FIG. 4B is a view showing a string of a first length of the length X composed of both concave pits and convex pits and the convex pits are not covered with reflective layers.

Shown in FIG. 4B is the other type of track segment having a string of both concave pits and convex pits in the length X altogether. Here, the convex pits are not covered with reflective layers. Note that it does not matter whether reflective layers that originally covered the concave pits remain to some extent or have been dissolved completely. Since there are no reflective layers covering the convex pits, the RF signals obtained by reading the concave pits and convex pits draw a waveform identical to that of the RF signals obtained by reading the concave pit shown in FIG. 4A. That is, in the RF signals, a low section continues longer than in RF signals obtained by reading usual concave pits and convex pits. Since the low section continues longer than usual, a track segment of the type shown in FIG. 4B is also suitable as a disc identifier.

Note that increasing the numeric value N, i.e. the number of processed parts, naturally requires more manufacturing steps, which consequently requires additional cost. Yet, the greater numeric value N provides stronger copyright protection as all the processed parts need to be duplicated in order to manufacture an unauthorized disc.

The above-described track segments of the types shown in FIGS. 4A and 4B and located in processed parts are used as disc identifiers.

Hereinafter, description is given to difficulty in duplicating the disc identifiers. In order to duplicate a disc identifier as shown in FIGS. 4A or 4B, the length and address of the disc identifier indicated by the physical feature information need to be decoded first. Further, although the information is decoded, various devices need to be prepared in order to duplicate the disc identifier. To be more concrete, the disc identifiers shown in FIGS. 4A and 4B are not readable with optical pickups installed in commercially available reproduction devices and recording devices. Consequently, it is required to prepare equipment including a device having a specific optical pickup installed therein, and a laser processing apparatus for laser-processing the optical disc. Still further, provided that necessary equipment is available at hand, processing a disc identifier with high accuracy requires a large cost and a long time. It goes without saying that a greater number of disc identifiers require the cost and time to a much greater extent, so that the copyright of the original optical disc is protected more firmly.

The disc identifiers described above are merely one preferred embodiment, and other types of processed part than the above processed part may be of course used as a disc identifier. To be more specific, optical discs may be processed, for example, by (1) applying a coating on an optical disc at any given part, (2) intentionally damaging an optical disc at any given part, (3) embedding a specific data pattern randomly, and (4) providing minute concave pits and convex pits of 1T or 2T in length, and the resulting processed part may be used as a disc identifier.

Figure 5:
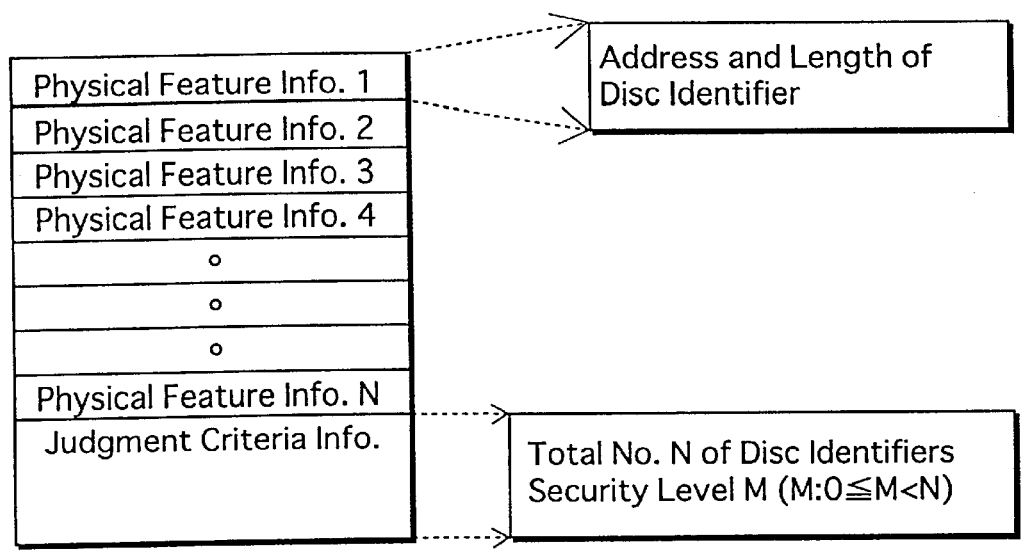
FIG. 5 is a view showing contents recorded in a BCA.

Next, description is given to the BCA. FIG. 5 is a view showing contents recorded in the BCA 3. In the BCA 3, N pieces of the physical feature information and one piece of judgment criteria information are recorded in encrypted form. The N pieces of physical feature information are pieces of information each of which indicates the address and length of one of the disc identifiers. The judgment criteria information includes (1) the numeric value N which is the total number of processed parts and (2) a numeric value M.

The numeric value M is an integer between 0 and N inclusive representing the security level to be provided for the copyrighted digital product recorded on the optical disc. When the numeric value M is almost equal to the numeric value N, read errors occurred at only one or two processed parts will result in that the optical disc is no longer recognized as original. On the other hand, however, in order to manufacture an unauthorized disc, the processed parts almost equal in number to the numeric value N need to be duplicated. This requires more steps in manufacturing such an unauthorized disc, so that copyright of the digital product is protected firmly.

Alternatively, when the numeric value M is relatively smaller than the numeric value N, the optical disc is still recognized as original even if relatively a large number of processed parts are in an abnormal state. Accordingly, users are not required to carefully handle such an optical disc. On the other hand, however, unauthorized copying of such an optical disc requires duplication of merely two or three processed parts out of the N processed parts, which provides copyright protection at a lower level.

Figure 6:
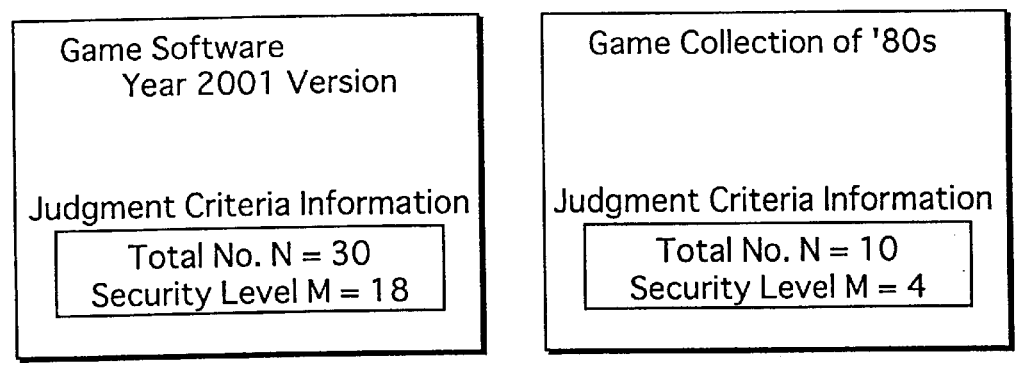
FIG. 6 is a view showing specific examples 1 and 2 of setting of numeric values N and M.

Now, description is given to specific examples of how to determine the numeric values N and M in consideration of the above. FIG. 6 is a view showing specific examples 1 and 2 of setting of the numeric values N and M. In the specific example 1, the copyrighted digital product to be recorded on optical discs is a game of the year 2001 version, which is the latest version. Here, the numeric value N is set at 30, which is relatively large, and the numeric value M is set at 18, which is not equal to 30 but still relatively large. Both the numeric values N and M being relatively large, a high level of copyright protection is provided for the digital product. The ratio of the numeric value M to the numeric value N is 3:5, so that the optical disc is reproducible even if read errors occur at twelve of the processed parts. Even in case where a user roughly handles the optical disc, errors occur in up to $\frac{2}{5}$ of the processed parts are permissible. Yet, unauthorized copying of this optical disc requires 18 out of 30 processed parts to be duplicated, which still makes it difficult to manufacture unauthorized discs. In other words, copyright is firmly protected without requiring users to carefully handle the optical discs, so that benefits of users and copyright holders are both ensured.

In the specific example 2, the copyrighted digital product to be recorded on optical discs is a collection of games released back in 1980s. Here, the numeric values N and M are respectively set at 10 and 4, both of which are relatively small. As the numeric values N and M are both relatively small, copyright protection provided for the digital product is of a low level. The ratio of the numeric value M to the numeric value N is 2:5, so that the optical disc is reproducible even if read errors occur at six of the processed parts. Even in case where a user roughly handles the optical disc, errors occur in up to $\frac{3}{5}$ of the processed parts are permissible. However, unauthorized copying of this optical disc merely requires four out of ten processed parts to be duplicated, which only provides a low level of copyright protection. Yet, considering the fact that the copyrighted digital product in this specific example 2 is a revival version of the games released in 1980s and intended to be sold at a low price, demands of the copyright holders are still satisfied. In other words, in the specific example 2 as well as in the specific example 1, benefits of both users and copyright holders are ensured.

Figure 7:
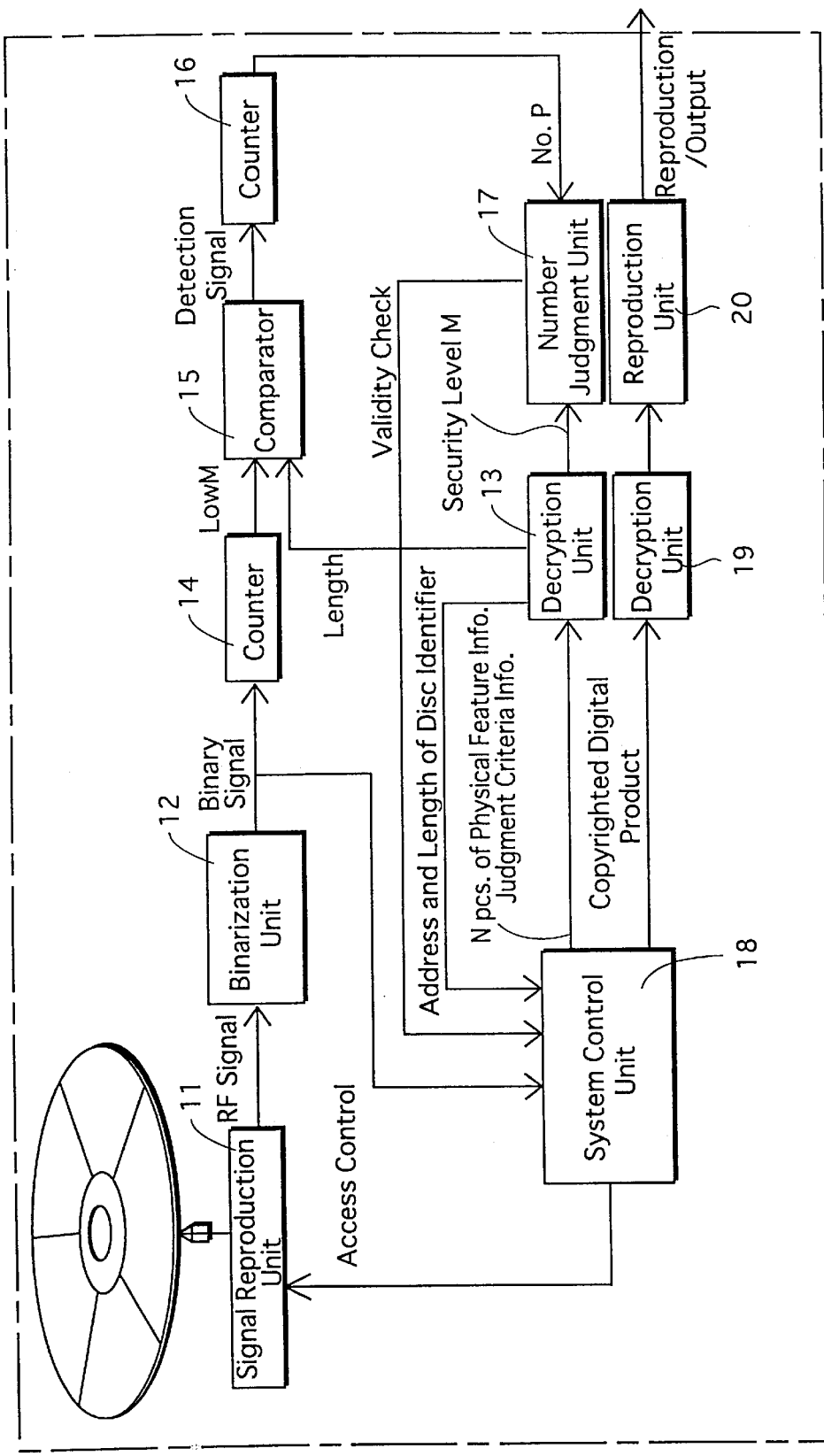
FIG. 7 is a view showing the internal construction of a reproduction device.

By setting the numeric values in the manner shown in the specific examples 1 and 2, benefits of both users and copyright holders are ensured regardless of whether the copyrighted digital products put on the market are expensive ones or inexpensive ones. Here, the description of the optical disc according to this embodiment is concluded, and description is now given to a reproduction device according to this embodiment. FIG. 7 is a view showing the internal construction of a reproduction device according to this embodiment. As shown in the figure, the reproduction device according to this embodiment is composed of a signal reproduction unit 11, a binarization unit 12, a decryption unit 13, a counter 14, a comparator 15, a counter 16, a number judgment unit 17, a system control unit 18, a decryption unit 19, and a reproduction unit 20.

The signal reproduction unit 11 accesses the optical disc under instructions given from the system control unit 18, and reads a pit string formed on the optical disc so as to output RF signals to the binarization unit 12.

The binarization unit 12 binarizes the RF signals with a predetermined threshold to obtain binary signals. Here, binary signals obtained by reading pit strings acting as disc identifiers are outputted to the counter 14, while binary signals obtained by reading pit strings other than disc identifiers are outputted to the system control unit 18.

The decryption unit 13 decrypts the physical feature information and the judgment criteria information that the signal reproduction unit 11 has read by accessing the BCA and that have been binarized by the binarization unit 12. The decryption unit 13 then passes the decrypted information to the signal reproduction unit 11.

After the signal reproduction unit 11 accesses the N processed parts to read a disc identifier from each of the processed parts, and the binarization unit 12 binarizes the read disc identifiers, the counter 14 counts the length of a low section present in the thus obtained binary signals.

The comparator 15 compares the length of low section that is present in the binary signals and that is counted by the counter 14 with the length of disc identifier shown by the physical feature information. In the event the two lengths match, the comparator 15 outputs a detection signal to the counter 16.

The counter 16 counts the number P of the detection signals outputted from the comparator 15.

The number judgment unit 17 compares the numeric value M representing the security level shown in the judgment criteria information with the number P of the detection signal counted by the counter 16. In the event the number P of processed parts in a normal state exceeds the security level M, the number judgment unit 17 judges the optical disc as original. In the event the number P falls short of the security level, the number judgment unit 17 judges the optical disc as an unauthorized one.

Having been installed an optical disc, and instructed to reproduce the optical disc, the system control unit 18 reads from the BCA the N pieces of physical feature information as well as the judgment criteria information. The system control unit 18 then outputs the read information to the decryption unit 13 and instructs the decryption unit 13 to decrypt the received information. Upon decrypting the N pieces of physical feature information and the judgment criteria information, the system control unit 18 controls the signal reproduction unit 11 to access the optical disc based on the address and length indicated by the decrypted physical feature information. The system control unit 18 then waits for the number P of processed parts in a normal state to be counted and for the number P to be compared with the numeric value N by the number judgment unit 17. In the event the number P exceeds the numeric value N, the system control unit 18 instructs the signal reproduction unit 11 to read out the copyrighted digital product. In the event the number P falls short of the numeric value N, the system control unit 18 does not instruct the signal reproduction unit 11 to read out the copyrighted digital product.

When it is judged that the number P of the processed parts in a normal state exceeds the numeric value N and consequently the signal reproduction unit 11 reads out the copyrighted digital product, the decryption unit 19 decrypts the read copyrighted digital product.

The reproduction unit 20 reproduces the copyrighted digital product decrypted by the decryption unit 19.

Figure 8:
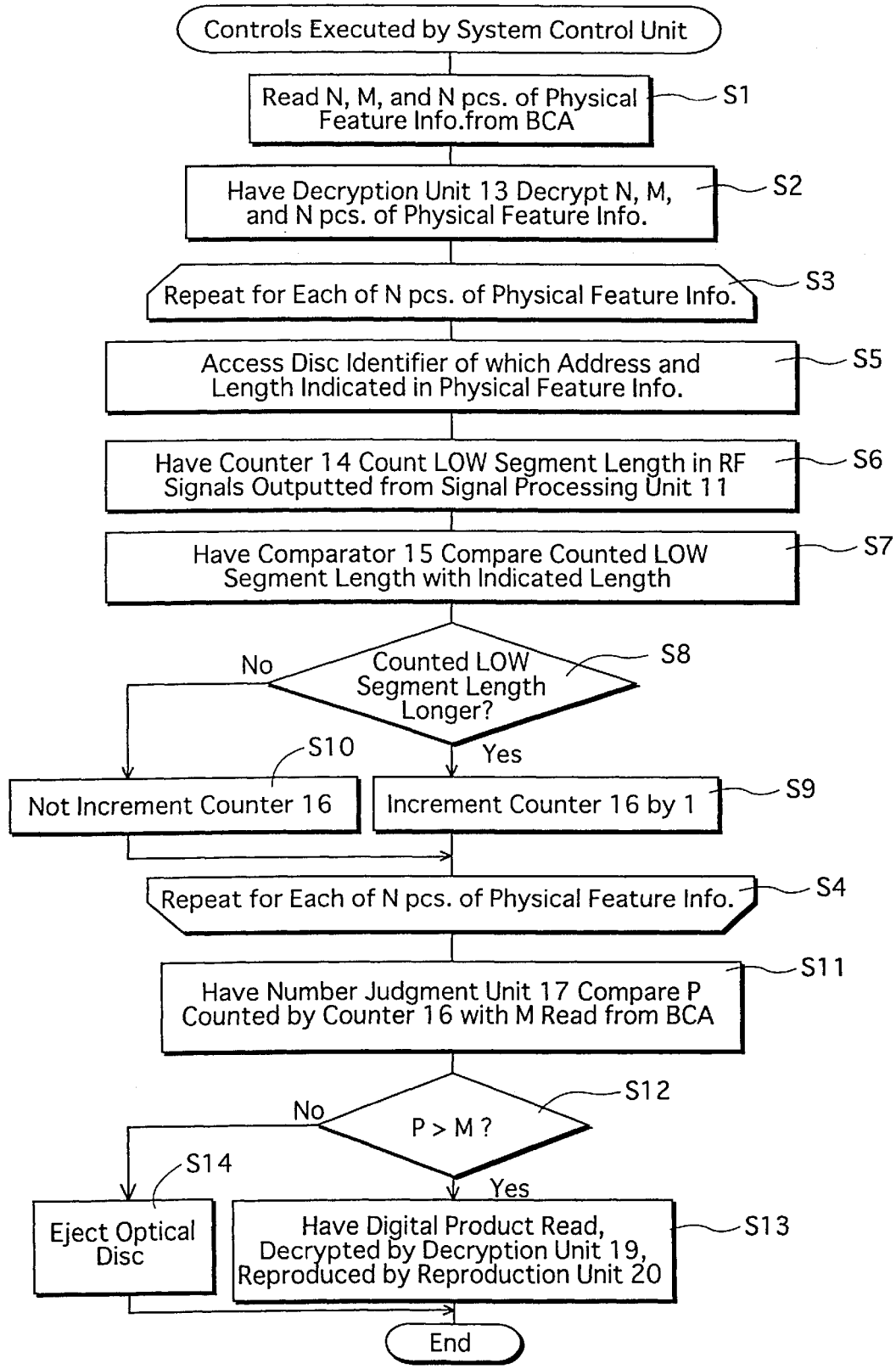
FIG. 8 is a flowchart showing controls executed by a system control unit 18.

Hereinafter, description is given to controls executed by the system control unit 18 with reference to a flow chart shown in FIG. 8. In a step S1, the system control unit 18 reads out the numeric values N and M, and the N pieces of physical feature information. In a step S2, the system control unit 18 has the decryption unit 13 decrypt the read numeric values N and M as well as the N pieces of physical feature information. Next, the system control unit 18 goes on to loop processing defined by a loop control statement in steps S3 and S4. The loop processing is to repeat steps S5–S10 for each of the N pieces of physical feature information. In the step S5, the system control unit 18 accesses the optical disc so as to read a disc identifier of which address and length are indicated in the physical feature information. In step S6, the system control unit 18 has the counter 14 count the length of a low segment present in the RF signals outputted from the signal reproduction unit 11. When the counter 14 finishes counting, the system control unit 18, in a step S7, has the comparator 15 compare the low segment length that has been counted with the length that is indicated in the physical feature information. In the event that the counted low segment is longer, the counter 16, in a step S9, increments the count by "1", while in the event that the counted low segment is shorter, the counter 16, in a step S10, does not increment the count.

By repeating the above processing for each of the N pieces of physical feature information, the counter 16 in the end counts the number P of all the disc identifiers in a normal state. In a step S11, the system control unit 18 has the number judgment unit 17 compare the number P counted by the counter 16 with the numeric value M read out from the BCA. In a step S12, the system control unit 18 judges whether the number P exceeds the numeric value M. In the event that the number P falls short of the numeric value M, the system control unit 18 ejects the optical disc in a step S14. On the other hand, in the event that the number P exceeds the numeric value M, the system control unit 18, in a step S13, has the copyrighted digital product read, decrypted by the decryption unit 19, and then reproduced by the reproduction unit 20.

As has been described, according to this embodiment, the optical disc stores the N processed parts recorded thereon. In addition, the optical disk stores in the BCA the numeric value M that is equal to the numeric value N or smaller and represents the security level of the copyrighted digital product. In the case where the numeric value N is equal to 10, even if two or three of the processed parts in an abnormal state, there is no effect as long as at least M processed parts are read normally. Thus, only optical discs that users are required to handle with care are the ones considered to be important by the copyright holders and thus given high security levels. The users are not required to carefully handle the optical discs that are considered to be less important by the copyright holders and thus given low security levels. Accordingly, the overall troubles that users are required in handling the optical discs are reduced.

Second Embodiment

In the first embodiment, an optical disc is judged to be original based on whether the number P of disc identifiers in a normal state is equal to or greater than the numeric value M. In a second embodiment, however, an optical disc is judged to be original based on whether the number P of disc identifiers in a normal state is equal to or greater than the value obtained by multiplying the numeric value M by a weighting factor $\alpha$. That is, in the second embodiment, an optical disc is judged to be original when the following relation is satisfied.

$$P \geq \alpha \cdot M$$

$(1 \geq \alpha \geq 0)$

Now, description is given to how to determine the weighting factor $\alpha$ using specific examples.

(1) Example in which Copyrighted Digital Product is Computer Software or Game Software and Weighing Factor $\alpha$ is Varied Depending on Date Product is Recorded/Commercially Released When optical discs are put into the market, the date at which copyrighted digital products are recorded/commercially released may be recorded on the optical discs. Further, reproduction devices may include a timer or a calendar for measuring a current time and date. In this case, such a reproduction device reads out the date from such an optical disc to compare with the date measured by the timer installed. Based on the comparison, the reproduction device judges whether the copyrighted digital product is within early days since its release date, or quite a long time has passed from the release date. When it is judged that the copyrighted digital product is a recently released one, the weighting factor α is set at 1. When it is judged, on the other hand, that a few years have passed since its commercial release and that the product has lost most of its value as a copyrighted digital product, the weighting factor α is set at 0. In the latter case, the digital product is regarded as free software.

Figure 9:
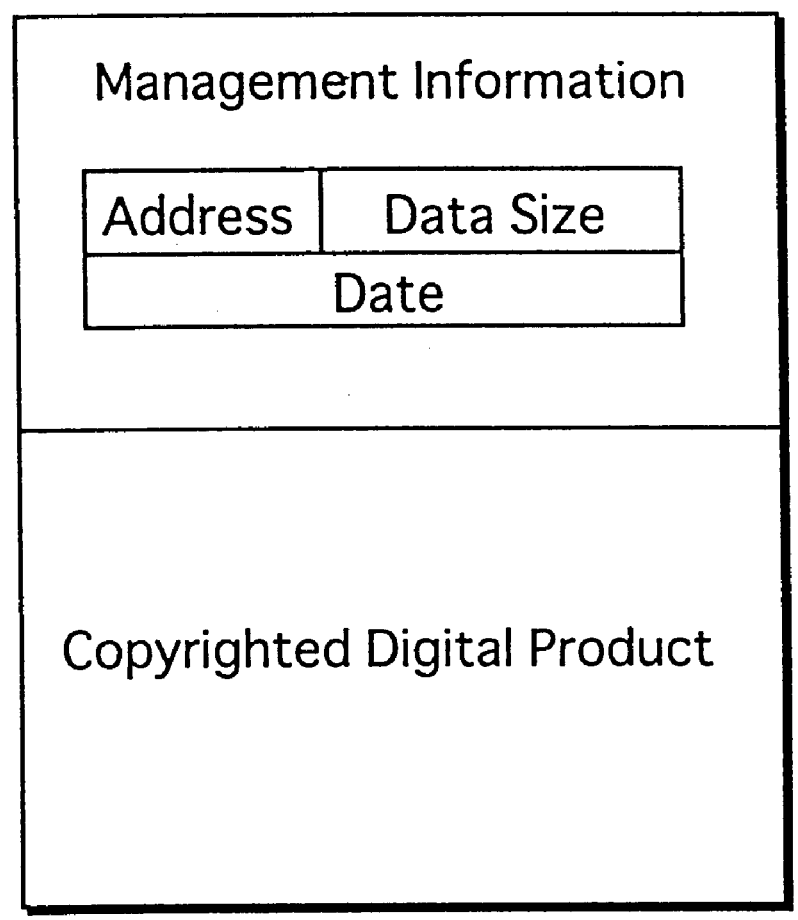
FIG. 9 is a view showing how a copyrighted digital product is recorded on an optical disc.

(2) Example in Which Weighting Factor α is Varied Depending on Type of Copyrighted Digital Product When a copyrighted digital product recorded on optical discs is image data and audio data, such as movie software, having been given a high security level, the weighting factor α is set at 1 so as to prohibit copying of the copyrighted digital products onto other optical discs. On the other hand, however, when the copyrighted digital product is image data and audio data which is out of copyright and thus has a low security level, the weighting factor α is set within a range of 1>α≧0, thereby allowing copying of the copyrighted digital product but with reduced image and audio quality. FIG. 9 is a view showing how a copyrighted digital product is recorded on an optical disc. Recorded on the optical disc along with the copyrighted digital product is management information. The management information indicates the address of the copyrighted digital product, the data size, and the date at which the product is recorded. The date that the management information indicates is compared with the date measured by the timer installed in the reproduction device to determine the weighting factor α.

FIGS. 10A and 10B are views showing examples of how the weighting factor α is determined based on the recording date indicated in the management information and the current date measured by the timer installed in the reproduction device. In FIG. 10A, the current date measured by the timer installed in the reproduction device is Mar. 29, 2001 and the recording date indicated by the management information is Jan. 11, 2001. This means that it has been only relatively a short time since the copyrighted digital product was recorded. Accordingly, the reproduction device determines the weighting factor α as "1", multiplies the numeric value M by the determined weighting factor α, and compares the result with the number P.

In FIG. 10B, the current date measured by the timer installed in the reproduction device is Mar. 29, 2001 and the recording date indicated by the management information is Jan. 11, 1999. This means that it has been two years since the copyrighted digital product was recorded. Accordingly, the reproduction device determines the weighting factors α as "0.3", multiplies the numeric value M by the determined weighting factor α, and compares the result with the number P.

As described above, according to this embodiment, the weighting factor α is varied depending on a copyrighted digital product recorded on the optical disc, and the number P is compared with the value obtained by multiplying the numeric value M by the resulting weighting factor α. As a result, the optical disc storing a digital product that is out of copyright or the digital product that was released relatively a long time ago is judged to be original even if read errors occur in a large number of disc identifiers. Accordingly, users are no longer required to carefully handle the optical discs that store digital products out of copyright or digital products that were released relatively a long time ago, so that the users are gradually relieved from troublesome handling of the optical discs.

Third Embodiment

Figure 11:
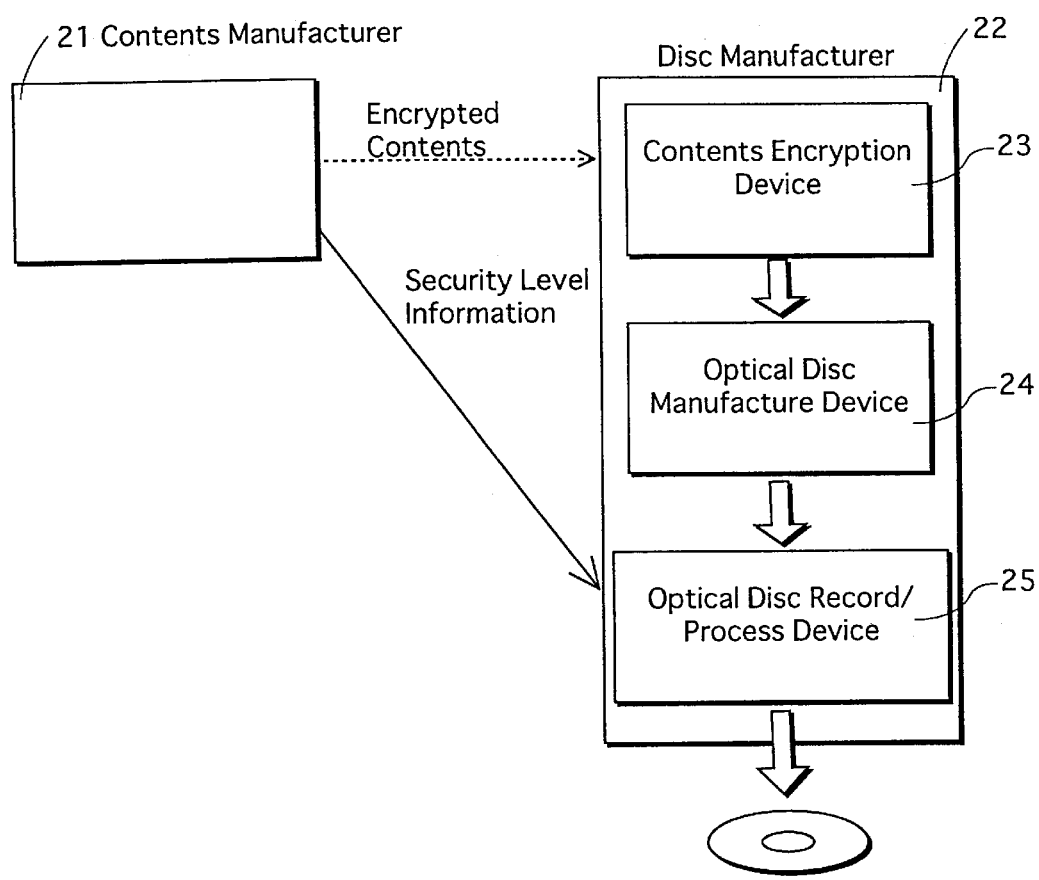
FIG. 11 is a view showing organization of human resources and manufacturing resources for manufacturing optical discs as well as devices used in the organizations.

In a third embodiment, description is given to how optical discs shown in the first embodiment is manufactured. FIG. 11 is a view showing an organization of human resources and manufacturing resources for manufacturing optical discs as well as devices used in the organizations.

A contents manufacturer 21 is a maker for creating image data, computer software, and game software and holds the copyrights of their digital products. Having a copyrighted digital product ready to be recorded on optical discs, the contents manufacturer 21 sends a disc manufacturer 22 the copyrighted digital product along with security level information. The security level information is information indicating the value of the copyrighted digital product, which is determined comprehensively based on, for example, the following factors. The factors include the confidentiality and importance of the digital product, whether the product is free software, and usage limitation representing whether the usage of the product is limited to any specific users.

As shown in FIG. 11, the disc manufacturer 22 has a contents encryption device 23, an optical disc manufacture device 24, and an optical disc record/process device 25.

The contents encryption device 23 encrypts the copyrighted digital product supplied by the contents manufacturer 21 to generate encrypted digital data.

The optical disc manufacture device 24 records the encrypted digital data constituting the copyrighted digital product onto disc substrates (hereinafter referred to as stampers), and then mass-replicates the copyrighted digital product onto optical discs using the stampers.

The optical disc record/process device 25 sets the numeric value N being the total number of the disc identifiers, and the numeric value M representing the security level according to the security level information provided by the contents manufacturer 21. The optical disc record/process device 25 then processes each of the optical discs mass-replicated by the optical disc manufacture device 24 so that each of the optical disc has N processed parts (disc identifiers). After processing one optical disc to provide N processed parts thereon, the optical disc record/process device 25 generates (1) the physical feature information indicating the address and length of each disc identifier and (2) the judgment criteria information indicating the numeric value N being the total number of the disc identifiers and the numeric value M representing the security level. The optical disc record/process device 25 then encrypts the judgment criteria information and the N pieces of physical feature information, and records encrypted data in the BCA of the optical disc. The same process is repeated for each of the remaining optical discs.

As described above, according to this embodiment, the numeric value N being the total number of disc identifiers and the numeric value M representing the security level to be recorded on optical discs are varied according to the security information determined by the contents manufacturer 21. As a result, difficulty of unauthorized copying is varied depending on the property of copyrighted digital product.

Note that the contents manufacturer 21 may directly determine the numeric value N being the total number of disc identifiers and the numeric value M representing the security level, and then notify the disc manufacturer 22 of the determined values, N and M. Here, when the number of disc identifiers and/or the numeric value M representing the security level are set to be greater, more disc identifiers need to be provided, which raises the manufacturing cost. Accordingly, it is desirable that disc manufacturer 22 adjust the license fee according to the security level determined by the contents manufacturer 21.

Industrial Applicability

The present invention is useful in manufacturing for selling optical discs that store a copyrighted digital product recorded thereon. Especially, the present invention has a great potential of being applied in manufacturing industry for image and audio equipment as well as for information equipment.

What is claimed is:

1. An optical disc including a data area and a specific area, the data area having digital data recorded therein, wherein
the data area has N number of certification areas provided therein, each certification area certifying that the digital data is original data, and numeric value N being determined according to importance of the digital data, and
the specific area has the numeric value N and a numeric value M recorded therein, the numeric value N representing the total number of certification areas, and the numeric value M representing a judgment criterion calculated by subtracting from the numeric value N an estimated number of certification areas in which a read error occurs.

2. The optical disc of claim 1, wherein
the specific area has n pieces of physical feature information recorded therein, each piece of the physical feature information indicating a location and a length of one of the N certification areas, and
the numeric values N and M, the N pieces of physical feature information are encrypted.

3. The optical disc of claim 2, wherein
in the data area except for the certification areas, concave pits and convex pits corresponding to the digital data are formed,
a length of each of the concave pits and convex pits is from a first length to a second length, and
the certification areas have concave pits each of which is longer than the second length.

4. The optical disc of claim 3, wherein
each of the concave pits which is longer than the second length is a series of convex pits and concave pits, the convex pits having no reflective layer thereon.

5. A reproduction device for the optical disc of claim 1, comprising:
reading means for reading the numeric value M recorded on the optical disc in the specific area;
verifying means for verifying whether each of the N certification areas is in a normal state; and
judging means for judging whether the digital data recorded on the optical disc is original data by comparing a numeric value P with the numeric value M, the numeric value P being the number of certification areas in a normal state (P being an integer equal to or greater than 0 and less than N.

6. The reproduction device of claim 5, wherein
location information is recorded in the specific area, the location information indicating locations of each certification area, and
the verifying means verifies whether each of the N certification areas is in a normal state by accessing the certification area according to the location information.

7. The reproduction device of claim 6, wherein
the judging means judges the digital data recorded on the optical disc to be original data when the numeric value P is equal to or greater than a value obtained by multiplying the numeric value M by a weighting factor.

8. The reproduction device of claim 7, wherein
the optical disc further has recorded thereon a time and date at which the digital data is recorded,
the reproduction device further comprises clock means for measuring a current time and date, and
the weighting factor is determined based on a difference between the current time and date measured by the clock means and the time and date at which the digital data is recorded.

9. A recording device for an optical disc on which digital data has been recorded, comprising:
processing means for processing the optical disc at N randomly selected parts so as to form N certification areas, a numeric value N being determined according to importance of the digital data;
recording means for recording on the optical disc N pieces of physical feature information and a numeric value M, each piece of physical feature information indicating a location and a length of one of the N certification areas, and the numeric value M representing a judgment criterion calculated by subtracting from the numeric value N an estimated number of certification areas in which a read error occurs.

* * * * *